Dec. 2, 1969 H. S. YOURKE ET AL 3,482,176

MEMORY SENSE AMPLIFIER

Filed Jan. 4, 1966 2 Sheets-Sheet 1

INVENTORS
HANNON S. YOURKE
ROYCE W. FLETCHER

BY James E. Murray

ATTORNEY

MEMORY SENSE AMPLIFIER

Filed Jan. 4, 1966 2 Sheets-Sheet 2

United States Patent Office 3,482,176

Patented Dec. 2, 1969

3,482,176

MEMORY SENSE AMPLIFIER

Hannon S. Yourke, Poughkeepsie, N.Y., and Royce W. Fletcher, South Natick, Mass., assignors to International Business Machines Corporation, Armonk, N.Y., a corporation of New York Filed Jan. 4, 1966, Ser. No. 518,716
Int. Cl. H03f 3/34
U.S. Cl. 330—30 2 Claims

ABSTRACT OF THE DISCLOSURE

This specification describes a method and means for causing a steady state DC current to flow through a memory sense line connected between the bases of two transistors of a differential sense amplifier so as to bias these transistors so that they will have equal collector currents in their quiescent operating state.

The present invention relates to sense amplifiers and more particularly to DC coupled memory sense amplifiers.

The term "long tailed pair" is commonly used to describe a DC differential amplifier which has two transistors with their emitters connected to a common constant current source. This type of DC differential amplifier has many characteristics which make it desirable for use in amplifying memory sense line signals.

First of all, DC differential amplifiers have a rapid recovery time which is necessary for high-speed memory applications. Secondary, common mode rejection schemes can be employed with the long tailed pair differential amplifier to reject noise up into very high frequencies, In addition, the long tailed pair differential amplifier will amplify sense line signals of either polarity.

However, even with all these desirable characteristics, the long tailed pair DC differential amplifier has not been used extensively for amplifying sense line signals. This is because of an inherent unbalance in the quiescent collector currents of the two transistors of the long tailed pair when a memory sense line is connected between the bases of the two transistors. This undesirable unbalance in the quiescent collector currents is due primarily to differences in the characteristics of the two transistors. Attempts to match the characteristics of the two transistors so that the quiescent collector currents are equal have proven unsuccessful on a commercial scale. Furthermore, known differential amplifier trimming means which employ resistances in the collector or emitter circuits of the two transistors have proven unsatisfactory for use in making the collector currents equal because they adversely affect the gain of the transistors and are difficult to implement commercially.

Therefore, it is an object of the present invention to provide a new DC sense amplifier.

It is another object of the present invention to provide a DC memory sense amplifier which employs a long tailed pair DC differential amplifier.

A still further object of the invention is to provide a new way of balancing the collector currents of the transistors of a DC differential amplifier employed in a memory sense amplifier.

In accordance with the objects of the present invention, method and means are provided for causing a steady state DC current to flow through the sense line connected between the bases of the transistors in a manner which will bias the transistors so that they will have equal collector currents in their quiescent state.

The foregoing and other objects, features and advantages of the invention will be apparent from the following more particular description of a preferred embodiment of the invention as illustrated in the accompanying drawings of which:

Figure 1:
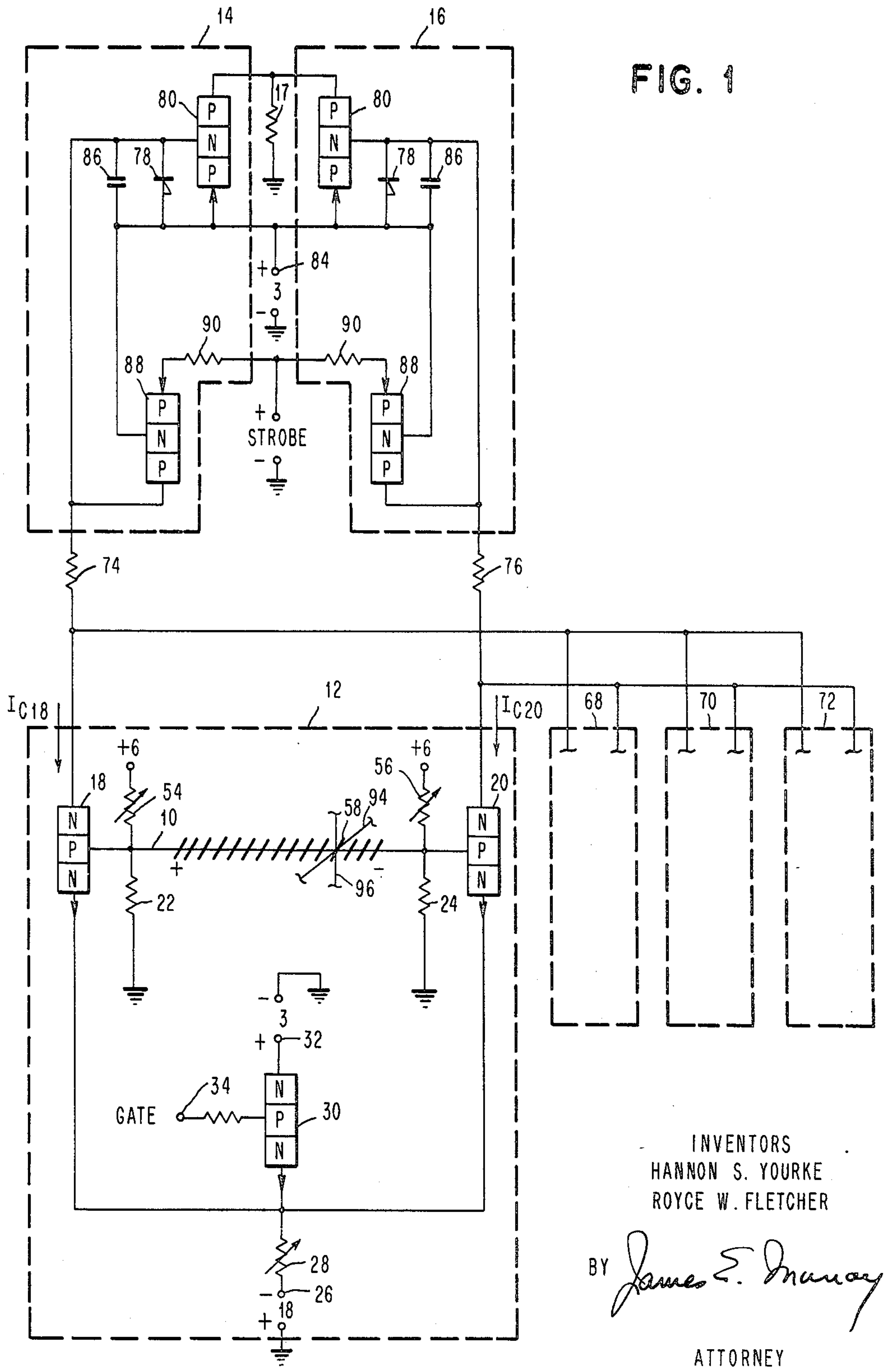
FIG. 1 is an electrical schematic of the preferred embodiment of the invention.

In the embodiment illustrated in FIG. 1, any voltage pulse induced in the sense line 10 is amplified by a DC differential amplifier 12 and converted to a high impedance output. Depending on the polarity of the induced voltage pulse, the resultant high impedance output is detected by either detector 14 or 16, to provide an output signal across the load 17.

The sense line 10 is connected between the bases of the transistors 18 and 20 of the DC differential amplifier 12 and is terminated at its ends by resistors 22 and 24 which are connected between the bases of transistors 18 and 20 and ground. For maximum efficiency, the resistance of resistors 22 and 24 is selected so that the sense line 10 is terminated at each end in its characteristic impedance. The connection of resistors 22 and 24 between the bases of transistors 18 and 20 and ground makes sense line 10 a balanced sense line thus converting much of the noise on the sense line to common mode signals which will not have an appreciable effect on the collector currents of transistors 18 and 20.

The emitters of the transistors 18 and 20 are connected to the negative terminal 26 of an 18-volt source through a relatively high resistance resistor 28. The source and the resistor 28 function together as a constant current source for the two transistors 18 and 20. The emitters of transistors 18 and 20 are also connected to a current switch. This current switch comprises a transistor 30 coupled between the emitters of transistors 18 and 20 and the positive terminal 32 of a 3 volt source. When a positive potential is applied to the gating terminal 34 for the transistor 30, the current from the constant current source flows through the transistor 30 to the positive terminal 32, thereby bypassing the transistors 18 and 20 so that they are incapable of responding to voltage pulses on the sense line 10. When transistor 30 is biased non-conductive, current from the constant current source flows through the transistors 18 and 20.

With the bases of transistors 18 and 20 joined by the sense line 10, the quiescent collector currents $I_{c18}$ and $I_{c20}$ of the transistors 18 and 20 are not equal. This is because the transistors 18 and 20 are not identical. That is to say the paramenters of transistor 18 are not the same as the parameters of transistor 20. In the past, attempts were made at matching the transistors 18 and 20 to eliminate the mismatch in the collector currents $I_{c18}$ and $I_{c20}$. These attempts proved commercially impractical because of the restringent technical and commercial requirements of memory sense amplifiers. Efforts were also made to balance the collector currents by putting variable resistors in the emitter paths of both the transistors 18 and 20. These resistors were then varied until a matching of the currents $I_{c18}$ and $I_{c20}$ was achieved. This balancing arrangement has a number of faults which make it unacceptable. First of all, the added resistance in the collector-emitter paths of the transistors 18 and 20 reduces the gain of the transistors thus requiring that the magnitude of pulses on the sense line be increased. In very high speed memories this is undesirable and in many cases, impractical. Another, and more important disability of the described balancing arrangement is that the gains of the transistors 18 and 20 are not equal because the resistances in their paths are not equal. Finally, the range of resistance values over which the resistance in the emitter-to-collector paths of the transistors must be varied to balance the collector currents is beyond the capability of many of the miniaturized circuit technologies.

In accordance with the present invention, a new technique is provided for balancing the quiescent collector currents $I_{c18}$ and $I_{c20}$ which overcomes many of the problems associated with the previously mentioned techniques. This new technique involves the passing of DC current through the core line 10 so as to provide a differential voltage across the core line that will compensate for mismatches in the transistors 18 and 20 and the associated circuitry.

Figure 2:
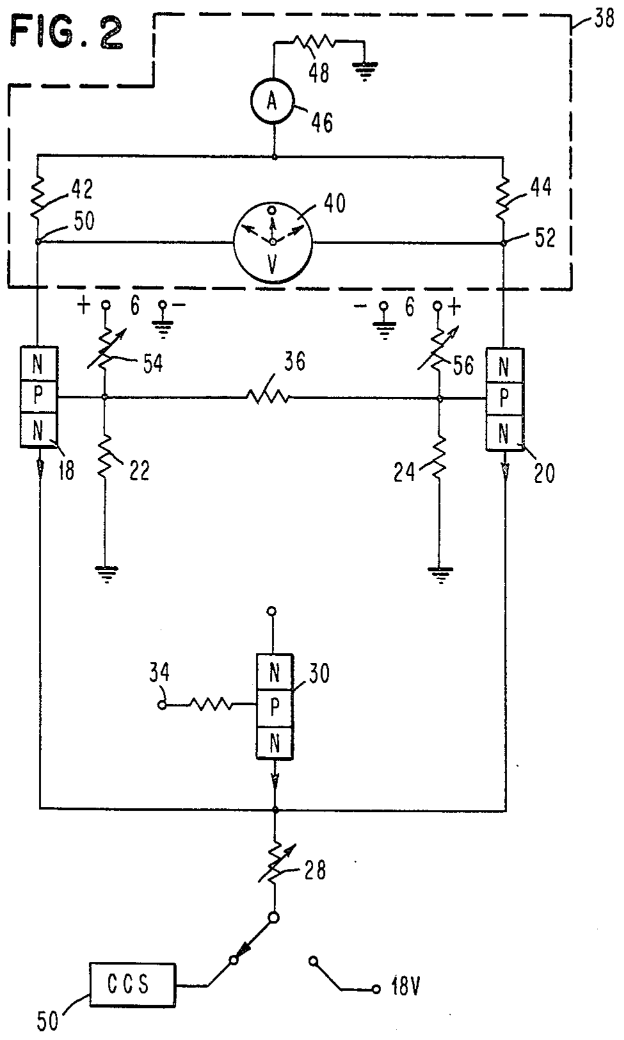
FIG. 2 is an electrical schematic of the method employed in trimming the DC differential amplifier shown in FIG. 1.

This new technique may best be understood by reference to FIG. 2 which shows the differential amplifier of FIG. 1 hooked up in a balance adjustment circuit. In this balancing circuit, a precision resistor 36 is substituted for the core line 10. This precision resistor 36 has a resistance value equal to that of the core line. In addition, in the balance adjustment circuit, the two detectors 14 and 16 are replaced by a measuring circuit 38 coupled to the collectors of the transistors 18 and 20. Measuring circuit 38 includes a null reading voltmeter 40 connected between the collectors. Connected in shunt with the voltmeter 40 are two resistors 42 and 44 of equal resistance, and connected in series between the junction point of the two resistances 42 and 44 and ground is an ammeter 46 and a resistor 48. Also in the balancing circuit, a constant current source 50 provides the differential amplifier with a steady supply of current equal in magnitude to the amount of current which will be supplied by the 18 volt source and the resistor 28 in the completed sense amplifier of FIG. 1.

With the differential amplifier hooked to the balance adjustment circuit, collector currents $I_{c18}$ and $I_{c20}$ flow through resistors 42 and 44, respectively, causing a voltage drop across each of the resistors. If the collector current $I_{c18}$ and $I_{c20}$ are equal, the voltmeter 40 will read 0 because points 50 and 52 will be at the same potential. However, if the collector currents $I_{c18}$ and $I_{c20}$ are not equal, the voltmeter 40 will deflect and measure a voltage because the points 50 and 52 will not be at the same potential. If the voltmeter deflects to the left, it means that $I_{c18}$ is greater than $I_{c20}$ and if the voltmeter deflects to the right, it means that $I_{c20}$ is greater than $I_{c18}$.

Figure 3:
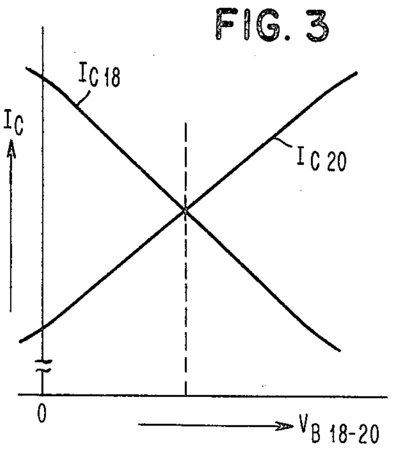
FIG. 3 is a graph showing the effect that the trimming has on the collector currents of the two transistors.

To adjust the collector currents of transistors 18 and 20, to make them equal, the bases of transistors 18 and 20 are each connected through separate variable resistors 54 and 56 to a positive terminal of a 6 volt source. Initially, variable resistors 54 and 56 are set to be equal and therefore there will be no voltage difference between the bases of transistors 18 and 20. Invariably, this means that the collector currents $I_{c18}$ and $I_{c20}$ are not equal. For the sake of explanation, it is assumed that in the case of this particular differential amplifier the collector current $I_{c18}$ is greater than the collector current $I_{c20}$. This is graphically represented in FIG. 3. As shown, $I_{c18}$ is greater than $I_{c20}$ when $V_{b18-20}$ is equal to zero or, in other words, when the difference between the potential at the bases of transistors 18 and 20 is zero. To make $I_{c18}$ and $I_{c20}$ equal, either resistor 54 or resistor 56 can be varied. If the resistance of resistor 54 is increased, the potential at the base of transistor 18 decreases relative to the potential at the base of transistor 20. As a result, $I_{c18}$ drops because of the change in bias, and $I_{c20}$ increases by the same amount because transistors 18 and 20 are supplied by common current source 50. Therefore, the collector currents $I_{c18}$ and $I_{c20}$ can be made equal by continuing to increase the resistance of resistor 54 until the voltmeter 40 reads zero. The same result can be obtained by decreasing resistance 56. This biases transistor 20 more positively thus permitting more current $I_{c20}$ to flow through transistor 20. As $I_{c20}$ increases, of course, $I_{c18}$ must decrease since the transistors 18 and 20 are supplied by the same constant current source. The relationship between the collector currents $I_{c18}$ and $I_{c20}$ with respect to the potential difference between the bias on their bases is shown in FIG. 3. The dotted line in FIG. 3 shows the value of $V_{b18-20}$ at which the collector currents $I_{c18}$ and $I_{c20}$ are equal. From the above description, it should be apparent that if $I_{c20}$ were greater than $I_{c18}$, the collector currents can be made equal by increasing resistance 56 or decreasing resistance 54 until the voltmeter 40 reads zero. Once the collector currents $I_{c18}$ and $I_{c20}$ are in balance, the terminal 26 is connected to the negative terminal of an 18 volt source and the resistance of the variable resistor 28 is changed until the desired value of current is read on the ammeter 46.

When the adjustment of resistors 28, 54 and 56 is completed, the DC differential amplifier may be disconnected from the balancing circuit of FIG. 2 and connected to sense line 10 and the detectors 14 and 16 as shown in FIG. 1. With the sense line 10 in place between the bases of the two transistors 18 and 20, current will flow through the sense line 10 between the bases because of the differential bias on the bases. This current flow maintains the differential bias on the bases and therefore it is very important that the sense line 10 be the same resistance as the resistor 36 used during balancing.

Figure 4:
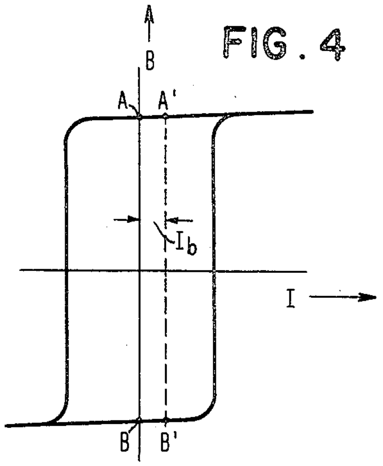
FIG. 4 is a graph showing the effect the trimming has on the individual cores on the sense line and FIG. 5 is a graph showing the operation of the detectors in the sense amplifier of FIG. 1.

It is also important that the current through the sense line be kept below a certain maximum. FIG. 4 is a typical hysteresis loop for one of the cores on the sense line 10. The core 58 normally resides in one of its remnant states, A or B, on the hysteresis loop. The hysteresis loop is centrally located around the B axis. Therefore, it will take approximately the same amount of current to switch from point A to remnant point B as it will to switch from remnant point B to remnant point A. However, if there is a bias current $I_b$ due to the differentially biasing of the bases of the transistors 18 and 20, the core 58 will reside at either point A′ or point B′ on its hysteresis curve. Points A′ and B′ are displaced from the axis and therefore it requires more current to switch from one of the remnant states to the other. In the illustrated case, it would take more current to switch from remnant state A to remnant state B than it would take to switch from remnant state B to remnant state A. Therefore, if the current $I_b$ represents a considerable portion of the total current necessary to switch the core, the biasing of the bases of transistors 18 and 20 as described above would have a serious effect on the operation of the memory. For this reason it is necessary to maintain the steady state current flow through the core at low levels with respect to the current necessary to switch the core so that the effect on the operation of the memory is minimal. Limitation of the current flow to the core can be affected by providing a sense line having sufficient resistance to keep the current below the desired minimum level. If, in certain applications, it turns out that the sense line 10 does not have a sufficiently high resistance to maintain the bias between the bases without affecting the operation of the memory, additional resistance may be added in series with the sense line 10 and the bases of the transistors 18 and 20. However, it is advisable to avoid this, since it will cut down the magnitude of the sense pulses and also possibly affect the balance of the sense line 10.

The differential amplifier 12 is one of four identical differential amplifiers 12, 68, 70 and 72 connected to the detectors 14 and 16. The collector of one transistor in each of the differential amplifiers is connected through resistor 74 to the detector 14 and the collector of the other transistor in each differential amplifier is connected to the detector 16 through the resistor 76.

Each of the detectors 14 and 16 consists of a tunnel diode 78 connected across the base and emitter of a transistor 80. The common load 17 for the two detectors 14 and 16 is connected between the collectors of the transistors 80 and ground, and the positive terminal 84 of a 3 volt source is connected to the emitters of the transistors 80. Connected in parallel with each of the tunnel diodes 78 is a capacitor 86 which shunts high-frequency noise to ground. The capacitors 86 and resistors 74 and 76 are not absolutely necessary and in high frequency applications, they can be eliminated.

Figure 5:
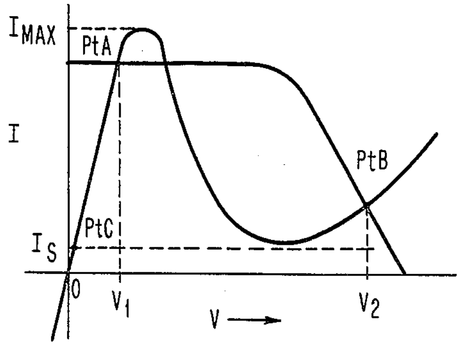

FIG. 5 shows the characteristics of the tunnel diodes 78. When the transistors 18 and 20 of differential amplifier 12 are in their quiescent state, the collector currents $I_{c18}$ and $I_{c20}$ bias the tunnel diodes 78 at point A on their characteristic curves. At this point, there is a voltage $V_1$ across the tunnel diodes 78. This voltage is insufficient to cause the conduction of the transistors 80 and therefore there is no current flowing through the transistors 80. However, when one of the transistors 18 or 20 is biased positively by a sense pulse of the proper polarity, collector current of that transistor increases and, therefore, so does the current through the tunnel diode 78 connected to the collector of that transistor. This drives the tunnel diode 78 over its maximum current point $I_{max}$ so that the tunnel diode passes through its negative resistance portion of its characteristic to approximately point B on its characteristic curve. At this point, voltage across the tunnel diodes 78 is $V_3$ which is sufficient to bias the transistor 80 conductive thereby producing an output signal across the load 17. The current flowing through transistors 18 and 20 in their quiescent state is sufficient to maintain the tunnel diodes 78 at point B on the curve.

To prevent noise from triggering the tunnel diodes at times other than during the read portion of the read-write cycle, a strobe circuit is provided. This strobe circuit includes a transistor 88 and a resistor 90 for each of the detectors 14 and 16. The collectors of the transistors 88 are connected to the base of the transistors 80 and the base of the transistors 88 are connected to the emitters of the transistors 80. The emitters of the two transistors 88 are connected to a common strobe terminal 92. When a positive 6 volt pulse is applied to the strobe terminal 92, the transistors 88 are biased conductive since their bases are maintained at +3 volts by the source connected to the terminal 84. With the transistors 88 conducting, the current flow through the tunnel diodes 78 is reduced so that the tunnel diodes operate at or below point C on their characteristic curve. The tunnel diodes are much less sensitive to noise on the sense line 10 when they are operating at point C because it requires a larger current pulse to exceed $I_{max}$.

In operation, the detectors 14 and 16 are normally kept disabled by the maintaining of a +6 volt potential at the strobe terminal 92. Also, the differential amplifiers 12, 68, 70 and 72 are all kept disabled by maintaining the transistor 30 in each of them biased conductive with a positive gating potential on its base. Assume now that the information contained in core 58 is to be determined. Then transistor 30 in differential amplifier 12 is rendered nonconductive. This brings the tunnel diodes up to point C on their characteristic curves. The differential amplifiers 68, 70 and 72 are kept disabled while differential amplifier 12 is being used by maintaining conductive the transistors in them which correspond to transistor 30 in differential amplifier 12.

While transistor 30 is turned off, drive currents are passed through the core 58 along drive wires 94 and 96 to sense the state of core 58. This produces a voltage pulse along the sense line 10 that momentarily causes the collector current of one of the transistors 18 and 20 to increase and the other to decrease. To enable the detectors 14 and 16 to sense this momentary relative change in the collector current levels the transistors 88 are biased nonconductive for a period during this change. This brings the quiescent operation points of both the tunnel diodes 78 to point A on their characteristic curves where they are able to distinguish between the change in the collector currents caused by a "0" stored in the core 58 and the change in collector currents caused by a "1" stored in the core 58. If a "0" is stored in the core 58, the collector currents will not be of sufficient magnitude to switch the tunnel diodes 78 in either of the detectors 14 or 16 from point A to point B on its characteristic curve, and therefore the transistors 80 remain nonconductive. If a "1" is stored in the core 58, a collector current pulse is produced by one of the transistors 18 and 20 which is sufficient to switch one of the tunnel diodes 78 to point B on its characteristic curve. If this pulse is of the polarity indicated by the plus and minus sign across the sense line 10, it momentarily causes the collector current of transistor 18 to increase and transistor 20 to decrease. The increase in the collector current of transistor 18 causes the tunnel diode 78 in detector 14 to shift from point A on its characteristic curve to point B on its characteristic curve. This biases transistor 80 in detector 14 conductive thus drawing current through the load 17. Transistor 80 in detector 14 remains conductive until the 6 volt strobe voltage is again applied to strobe terminal 92 whereupon current through the tunnel diode 78 in detector 14 is reduced so that the tunnel diode shifts back to point C on its characteristic curve and turns the transistor 80 off. If the polarity of the current pulse produced in the sense line 10 is opposite to that illustrated by the plus and minus sign across the sense line 10, detector 16 is actuated in the same way as described for detector 14 and likewise produces a current pulse through the load 17.

After the transistors 88 are biased conductive by the return of the strobe voltage, the transistor 30 is biased conductive to disable the DC differential amplifier 12.

While the invention has been particularly shown and described with reference to a preferred embodiment thereof, it will be understood by those skilled in the art that various changes in form and detail may be made therein without departing from the spirit and scope of the invention.

We claim:

1. In a differential sense line amplifier having two transistors with their emitters connected to a common constant current source, and their bases connected to opposite ends of a memory sense line, the improvement which comprises connection means connecting the emitters of the two transistors together through a substantially zero impedance connection and trimming means for establishing a steady state DC current through the memory sense line of the proper polarity and magnitude to bias the bases of the two transistors differentially at points where the transistors' quiescent collector currents are equal, wherein said trimming means includes a source of potential, a first set of two resistors connected in series across the source of potential and connected to the base of one of the transistors at a point common to both the resistors in the first set, and a second set of two resistors connected in series across the source of potential and connected to the base of the other transistor at a point common to both resistors in the second set.

2. The differential sense amplifier of claim 1 wherein one resistor in each of the first and second sets terminates the end of the sense line to which it is attached in its characteristic impedance and the other resistors in the two sets have different resistance value selected to make the collector currents of the transistors equal.

References Cited

UNITED STATES PATENTS

| | | | |
|---|---|---|---|
| 3,211,921 | 10/1965 | Kaufman et al. | 307—286 X |
| 3,215,854 | 11/1965 | Mayhew | 307—236 X |
| 3,315,089 | 4/1967 | Mayne | 307—286 X |

ROY LAKE, Primary Examiner

L. T. DAHL, Assistant Examiner

U.S. Cl. X.R.

307—286